US008683666B2

(12) United States Patent
Miller

(10) Patent No.: US 8,683,666 B2
(45) Date of Patent: Apr. 1, 2014

(54) RESTRAINT SYSTEM BUCKLE COMPONENTS HAVING TACTILE SURFACES, AND ASSOCIATED METHODS OF USE AND MANUFACTURE

(75) Inventor: Peter E. Miller, Phoenix, AZ (US)

(73) Assignee: AmSafe Commercial Products, Inc., Elkhart, IN (US)

( * ) Notice: Subject to any disclaimer, the term of this patent is extended or adjusted under 35 U.S.C. 154(b) by 710 days.

(21) Appl. No.: 12/939,809

(22) Filed: Nov. 4, 2010

(65) Prior Publication Data

US 2011/0099770 A1 May 5, 2011

Related U.S. Application Data

(60) Provisional application No. 61/258,110, filed on Nov. 4, 2009.

(51) Int. Cl.
| A44B 11/25 | (2006.01) |
| B05D 1/02 | (2006.01) |
| B05D 1/28 | (2006.01) |
| B29C 71/00 | (2006.01) |

(52) U.S. Cl.
USPC .................. 24/633; 24/197; 24/200; 280/808; 280/801.1

(58) Field of Classification Search
USPC ............ 24/633, 197, 200, 193, 629; 280/808, 280/801.1
See application file for complete search history.

(56) References Cited

U.S. PATENT DOCUMENTS

| 906,045 A | 12/1908 | Miller |
| 1,079,080 A | 11/1913 | Ward |
| 1,369,456 A | 2/1921 | Meredith |
| 1,438,898 A | 12/1922 | Carpmill |
| 1,930,378 A | 10/1930 | Beagan |
| 1,816,262 A | 7/1931 | Ritter |
| 2,132,556 A | 10/1938 | Blackshaw |
| 2,372,557 A | 3/1945 | Dowd |
| 2,437,585 A | 9/1948 | Zimmern |
| 2,482,693 A | 9/1949 | Rogers et al. |
| 2,538,641 A | 1/1951 | Elsner |
| 2,549,841 A | 4/1951 | Morrow et al. |

(Continued)

FOREIGN PATENT DOCUMENTS

| CA | 2038505 | 9/1991 |
| CA | 2091526 | 10/1993 |

(Continued)

OTHER PUBLICATIONS

"ExxonMobil Santoprene® 221-55 Thermoplastic Elastomer" materials sheet. Retreived from http://www.matweb.com/search/datasheet.aspx?matguid=67de0de851854bb085afcfac35e294f5 &ckck=1 on Jul. 8, 2013.*

ASTM D395-03 (Reapproved 2008) "Standard Test Methods for Rubber Property-Compression Set", Retreived from http://enterprise2.astm.org/DOWNLOAD/D395.1656713-1.pdf on Jul. 9, 2013.*

Britax, "COMPAQ: Convertible Car Seats." Buckle Image. Accessed Oct. 12, 2010. (2 pages). This has been publicly available for at least one year prior to this application's filing date.

(Continued)

*Primary Examiner* — Robert J Sandy
(74) *Attorney, Agent, or Firm* — Perkins Coie LLP

(57) ABSTRACT

Buckle assemblies for use with child seats and other personal restraint systems in vehicles are disclosed herein. A buckle assembly configured in accordance with one embodiment of the disclosure includes a housing assembly that receives at least a portion of a web connector. The housing assembly includes a coating having a generally soft or tactile surface finish. For example, the coating can be at least partially elastically compressible.

19 Claims, 5 Drawing Sheets

(56) References Cited

U.S. PATENT DOCUMENTS

| | | | |
|---|---|---|---|
| 2,639,852 A | 5/1953 | Sanders et al. |
| 2,641,813 A | 6/1953 | Loxham |
| 2,710,999 A | 6/1955 | Davis |
| 2,763,451 A | 9/1956 | Moran |
| 2,803,864 A | 8/1957 | Bishaf |
| 2,845,233 A | 7/1958 | Wrighton |
| 2,846,745 A | 8/1958 | Lathrop |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,938,254 A | 5/1960 | Gaylord |
| 2,964,815 A | 12/1960 | Sereno |
| 2,965,942 A | 12/1960 | Carter |
| 3,029,487 A | 4/1962 | Asai |
| 3,084,411 A | 4/1963 | Stig |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,137,907 A | 6/1964 | Unai |
| D198,566 S | 7/1964 | Holmberg et al. |
| 3,142,103 A | 7/1964 | Linbald |
| 3,145,442 A | 8/1964 | Brown |
| 3,165,805 A | 1/1965 | Lower |
| 3,178,226 A | 4/1965 | Lorwin |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board |
| 3,289,261 A | 12/1966 | Davis |
| 3,293,713 A | 12/1966 | Gaylord |
| 3,306,662 A | 2/1967 | Finnigan |
| 3,312,502 A | 4/1967 | Coe |
| 3,369,842 A | 2/1968 | Adams et al. |
| 3,380,776 A | 4/1968 | Dillender |
| 3,414,947 A | 12/1968 | Holmberg et al. |
| 3,428,029 A | 2/1969 | Klickstein |
| 3,451,720 A | 6/1969 | Makinen |
| 3,491,414 A | 1/1970 | Stoffel |
| 3,505,711 A | 4/1970 | Carter |
| 3,523,342 A | 8/1970 | Spires |
| D218,589 S | 9/1970 | Lorhr et al. |
| 3,564,672 A | 2/1971 | McIntyre |
| 3,576,056 A | 4/1971 | Barcus |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh |
| 3,678,542 A | 7/1972 | Prete, Jr. |
| 3,695,696 A | 10/1972 | Lohr et al. |
| 3,714,684 A | 2/1973 | Gley |
| 3,744,102 A | 7/1973 | Gaylord |
| 3,744,103 A | 7/1973 | Gaylord |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,825,979 A | 7/1974 | Jakob |
| 3,827,716 A | 8/1974 | Vaughn et al. |
| 3,856,351 A | 12/1974 | Garveys |
| 3,879,810 A | 4/1975 | Prete, Jr. et al. |
| 3,898,715 A | 8/1975 | Balder |
| 3,935,618 A | 2/1976 | Fohl et al. |
| 3,964,138 A | 6/1976 | Gaylord |
| 3,986,234 A | 10/1976 | Frost et al. |
| 3,995,885 A | 12/1976 | Plesniarski |
| 4,018,399 A | 4/1977 | Rex |
| 4,026,245 A | 5/1977 | Arthur |
| 4,051,743 A | 10/1977 | Gaylord |
| 4,095,313 A | 6/1978 | Piljay et al. |
| D248,618 S | 7/1978 | Anthony |
| 4,100,657 A | 7/1978 | Minolla et al. |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda et al. |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | DiPaola |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike et al. |
| 4,273,301 A | 6/1981 | Frankila |
| 4,302,049 A | 11/1981 | Simpson |
| 4,317,263 A | 3/1982 | Fohl et al. |
| 4,321,734 A | 3/1982 | Gandelman |
| 4,334,341 A | 6/1982 | Krautz et al. |
| 4,336,636 A | 6/1982 | Ishiguro et al. |
| 4,366,604 A | 1/1983 | Anthony et al. |
| 4,385,425 A | 5/1983 | Tanaka et al. |
| 4,408,374 A | 10/1983 | Fohl et al. |
| 4,419,874 A | 12/1983 | Brentini et al. |
| 4,425,688 A | 1/1984 | Anthony et al. |
| 4,457,052 A | 7/1984 | Hauber |
| 4,487,454 A | 12/1984 | Biller |
| 4,491,343 A | 1/1985 | Fohl |
| 4,525,901 A | 7/1985 | Krauss |
| 4,545,097 A | 10/1985 | Wier et al. |
| 4,549,769 A | 10/1985 | Pilarski |
| 4,555,831 A | 12/1985 | Otzen et al. |
| 4,569,535 A | 2/1986 | Haglund et al. |
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson et al. |
| 4,644,618 A | 2/1987 | Holmberg et al. |
| 4,646,400 A | 3/1987 | Tanaka et al. |
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,660,889 A | 4/1987 | Anthony et al. |
| 4,679,852 A | 7/1987 | Anthony et al. |
| 4,682,791 A | 7/1987 | Ernst et al. |
| 4,685,176 A | 8/1987 | Burnside et al. |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm et al. |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |
| 4,758,048 A | 7/1988 | Shuman |
| 4,766,654 A | 8/1988 | Sugimoto |
| 4,786,078 A | 11/1988 | Schreier et al. |
| 4,786,080 A * | 11/1988 | Jay .............. 280/808 |
| 4,790,597 A | 12/1988 | Bauer et al. |
| 4,809,409 A | 3/1989 | Van Riesen et al. |
| 4,832,410 A | 5/1989 | Bougher |
| 4,843,688 A | 7/1989 | Ikeda et al. |
| 4,854,607 A | 8/1989 | Mandracchia et al. |
| 4,854,608 A | 8/1989 | Barral et al. |

(56) References Cited

U.S. PATENT DOCUMENTS

| | | |
|---|---|---|
| D303,232 S | 9/1989 | Lortz et al. |
| 4,876,770 A | 10/1989 | Bougher |
| 4,876,772 A | 10/1989 | Anthony et al. |
| 4,884,652 A | 12/1989 | Vollmer |
| 4,901,407 A * | 2/1990 | Pandola et al. ................. 24/633 |
| 4,903,377 A * | 2/1990 | Doty .............................. 24/171 |
| 4,911,377 A | 3/1990 | Lortz et al. |
| 4,919,484 A | 4/1990 | Bougher et al. |
| 4,927,211 A | 5/1990 | Bolcerek |
| 4,934,030 A | 6/1990 | Spinosa et al. |
| 4,940,254 A | 7/1990 | Ueno et al. |
| 4,942,649 A | 7/1990 | Anthony et al. |
| 4,995,640 A | 2/1991 | Saito et al. |
| 5,015,010 A | 5/1991 | Homeier et al. |
| 5,023,981 A | 6/1991 | Anthony et al. |
| 5,026,093 A | 6/1991 | Nishikaji |
| 5,029,369 A | 7/1991 | Oberhardt et al. |
| 5,031,962 A | 7/1991 | Lee |
| 5,038,446 A | 8/1991 | Anthony et al. |
| 5,039,169 A | 8/1991 | Bougher et al. |
| 5,046,687 A | 9/1991 | Herndon |
| 5,054,815 A | 10/1991 | Gavagan |
| 5,067,212 A | 11/1991 | Ellis |
| 5,074,011 A | 12/1991 | Carlson |
| 5,074,588 A | 12/1991 | Huspen |
| 5,084,946 A | 2/1992 | Lee |
| 5,088,160 A | 2/1992 | Warrick |
| 5,088,163 A | 2/1992 | van Riesen |
| 5,097,572 A | 3/1992 | Warrick |
| D327,455 S | 6/1992 | Blair |
| 5,119,532 A | 6/1992 | Tanaka |
| 5,123,147 A | 6/1992 | Blair |
| 5,123,673 A | 6/1992 | Tame |
| 5,142,748 A | 9/1992 | Anthony et al. |
| 5,159,732 A | 11/1992 | Burke |
| 5,160,186 A | 11/1992 | Lee |
| 5,165,149 A * | 11/1992 | Nihei .............................. 24/633 |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth |
| 5,236,220 A | 8/1993 | Mills |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,272,770 A | 12/1993 | Allen et al. |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A | 2/1994 | Forster |
| 5,286,090 A | 2/1994 | Templin et al. |
| 5,292,181 A | 3/1994 | Dybro |
| 5,301,371 A | 4/1994 | Chao |
| 5,308,148 A | 5/1994 | Peterson et al. |
| 5,311,653 A | 5/1994 | Merrick |
| 5,350,195 A | 9/1994 | Brown |
| 5,350,196 A | 9/1994 | Atkins |
| 5,369,855 A | 12/1994 | Tokugawa |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,397,171 A | 3/1995 | Leach |
| 5,403,038 A | 4/1995 | McFalls |
| 5,406,681 A | 4/1995 | Olson |
| 5,411,292 A | 5/1995 | Collins et al. |
| 5,416,957 A * | 5/1995 | Renzi et al. ..................... 24/633 |
| D359,710 S | 6/1995 | Chinni et al. |
| 5,432,987 A | 7/1995 | Schroth |
| 5,435,272 A | 7/1995 | Epstein |
| 5,443,302 A | 8/1995 | Dybro |
| 5,451,094 A | 9/1995 | Templin et al. |
| D364,124 S | 11/1995 | Lortz et al. |
| 5,471,714 A | 12/1995 | Olson |
| 5,495,646 A | 3/1996 | Scrutchfield et al. |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,540,403 A | 7/1996 | Standley |
| 5,560,565 A | 10/1996 | Merrick et al. |
| 5,561,891 A | 10/1996 | Hsieh |
| 5,566,431 A | 10/1996 | Haglund |
| 5,568,676 A | 10/1996 | Freeman |
| 5,570,933 A | 11/1996 | Rouhana et al. |
| 5,579,785 A | 12/1996 | Bell |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,669,572 A | 9/1997 | Crook |
| 5,695,243 A | 12/1997 | Anthony et al. |
| 5,699,594 A | 12/1997 | Czank et al. |
| D389,426 S | 1/1998 | Merrick et al. |
| 5,722,689 A | 3/1998 | Chen et al. |
| 5,743,597 A | 4/1998 | Jessup et al. |
| 5,765,774 A | 6/1998 | Maekawa et al. |
| 5,774,947 A | 7/1998 | Anscher |
| 5,779,319 A | 7/1998 | Merrick |
| D397,063 S | 8/1998 | Woellert et al. |
| 5,788,281 A | 8/1998 | Yanagi et al. |
| 5,788,282 A | 8/1998 | Lewis |
| 5,794,878 A | 8/1998 | Carpenter et al. |
| 5,813,097 A | 9/1998 | Woellert et al. |
| 5,839,793 A | 11/1998 | Merrick et al. |
| 5,857,247 A | 1/1999 | Warrick et al. |
| 5,873,599 A | 2/1999 | Bauer et al. |
| 5,873,635 A | 2/1999 | Merrick |
| 5,882,084 A | 3/1999 | Verellen et al. |
| D407,667 S | 4/1999 | Homeier |
| 5,908,223 A | 6/1999 | Miller |
| 5,915,630 A | 6/1999 | Step |
| 5,928,300 A | 7/1999 | Rogers et al. |
| 5,934,760 A | 8/1999 | Schroth |
| D416,827 S | 11/1999 | Anthony et al. |
| 5,979,026 A | 11/1999 | Anthony |
| 5,979,982 A | 11/1999 | Nakagawa |
| 5,996,192 A | 12/1999 | Haines et al. |
| 6,003,899 A | 12/1999 | Chaney |
| 6,017,087 A | 1/2000 | Anthony et al. |
| 6,056,320 A | 5/2000 | Khalifa et al. |
| 6,065,367 A | 5/2000 | Schroth |
| 6,065,777 A | 5/2000 | Merrick |
| 6,123,388 A | 9/2000 | Vits et al. |
| 6,182,783 B1 | 2/2001 | Bayley |
| RE37,123 E | 4/2001 | Templin et al. |
| 6,224,154 B1 | 5/2001 | Stoki |
| 6,230,370 B1 | 5/2001 | Nelsen |
| 6,260,884 B1 | 7/2001 | Bittner et al. |
| 6,295,700 B1 | 10/2001 | Plzak |
| 6,309,024 B1 | 10/2001 | Busch |
| 6,312,015 B1 | 11/2001 | Merrick et al. |
| 6,315,232 B1 | 11/2001 | Merrick |
| 6,322,140 B1 | 11/2001 | Jessup et al. |
| 6,322,149 B1 | 11/2001 | Conforti et al. |
| 6,325,412 B1 | 12/2001 | Pan |
| 6,328,379 B1 | 12/2001 | Merrick et al. |
| 6,343,841 B1 | 2/2002 | Gregg et al. |
| 6,357,790 B1 | 3/2002 | Swann et al. |
| 6,363,591 B1 | 4/2002 | Bell et al. |
| 6,367,882 B1 | 4/2002 | Van Druff et al. |
| 6,374,168 B1 | 4/2002 | Fujii |
| 6,400,145 B1 | 6/2002 | Chamings et al. |
| 6,412,863 B1 | 7/2002 | Merrick et al. |
| 6,418,596 B2 | 7/2002 | Haas |
| 6,425,632 B1 | 7/2002 | Anthony et al. |

(56) References Cited

U.S. PATENT DOCUMENTS

| | | | |
|---|---|---|---|
| 6,442,807 B1 | 9/2002 | Adkisson |
| 6,446,272 B1 | 9/2002 | Lee |
| 6,463,638 B1 | 10/2002 | Pontaoe |
| 6,467,849 B1 | 10/2002 | Deptolla |
| 6,485,057 B1 | 11/2002 | Midorikawa et al. |
| 6,485,098 B1 | 11/2002 | Vits et al. |
| 6,508,515 B2 | 1/2003 | Vits et al. |
| 6,513,208 B1 | 2/2003 | Sack et al. |
| 6,520,392 B2 | 2/2003 | Thibodeau et al. |
| 6,543,101 B2 | 4/2003 | Sack et al. |
| 6,547,273 B2 | 4/2003 | Grace et al. |
| 6,560,825 B2 | 5/2003 | Maciejczyk |
| 6,566,869 B2 | 5/2003 | Chamings et al. |
| 6,588,077 B2 | 7/2003 | Katsuyama et al. |
| 6,592,149 B2 | 7/2003 | Sessoms |
| 6,606,770 B1 | 8/2003 | Badrenas Buscart |
| 6,619,753 B2 | 9/2003 | Takayama |
| 6,631,926 B2 | 10/2003 | Merrick et al. |
| 6,665,912 B2 | 12/2003 | Turner et al. |
| 6,694,577 B2 | 2/2004 | Di Perrero |
| 6,711,790 B2 | 3/2004 | Pontaoe |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,733,041 B2 | 5/2004 | Arnold et al. |
| 6,739,541 B2 | 5/2004 | Palliser et al. |
| 6,749,150 B2 | 6/2004 | Kohlndorfer et al. |
| 6,763,557 B2 | 7/2004 | Steiff et al. |
| 6,769,157 B1 | 8/2004 | Meal |
| 6,786,294 B2 | 9/2004 | Specht |
| 6,786,510 B2 | 9/2004 | Roychoudhury et al. |
| 6,786,511 B2 | 9/2004 | Heckmayr |
| 6,793,291 B1 | 9/2004 | Kocher |
| 6,796,007 B1 | 9/2004 | Anscher |
| 6,802,470 B2 | 10/2004 | Smithson et al. |
| 6,820,310 B2 | 11/2004 | Woodard et al. |
| 6,820,902 B2 | 11/2004 | Kim |
| 6,834,822 B2 | 12/2004 | Koning et al. |
| 6,836,754 B2 | 12/2004 | Cooper |
| 6,837,519 B2 * | 1/2005 | Moskalik et al. .......... 280/801.1 |
| 6,840,544 B2 | 1/2005 | Prentkowski |
| 6,851,160 B2 | 2/2005 | Carver |
| 6,857,326 B2 | 2/2005 | Specht et al. |
| 6,860,671 B2 | 3/2005 | Schulz |
| 6,863,235 B2 | 3/2005 | Koning et al. |
| 6,863,236 B2 | 3/2005 | Kempf et al. |
| 6,868,585 B2 | 3/2005 | Anthony et al. |
| 6,868,591 B2 | 3/2005 | Dingman et al. |
| 6,871,876 B2 | 3/2005 | Xu |
| 6,874,819 B2 | 4/2005 | O'Neill |
| 6,882,914 B2 | 4/2005 | Gioutsos et al. |
| 6,886,889 B2 | 5/2005 | Vits et al. |
| 6,896,291 B1 | 5/2005 | Peterson |
| 6,902,193 B2 | 6/2005 | Kim et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,922,875 B2 | 8/2005 | Sato et al. |
| 6,931,669 B2 | 8/2005 | Ashline |
| 6,935,701 B1 | 8/2005 | Arnold et al. |
| 6,951,350 B2 | 10/2005 | Heidorn et al. |
| 6,957,789 B2 | 10/2005 | Bowman et al. |
| 6,959,946 B2 | 11/2005 | Desmarais et al. |
| 6,962,394 B2 | 11/2005 | Anthony et al. |
| 6,966,518 B2 | 11/2005 | Kohlndorfer et al. |
| 6,969,022 B2 | 11/2005 | Bell et al. |
| 6,969,122 B2 | 11/2005 | Sachs et al. |
| 6,993,436 B2 | 1/2006 | Specht et al. |
| 6,997,474 B2 | 2/2006 | Midorikawa et al. |
| 6,997,479 B2 | 2/2006 | Desmarais et al. |
| 7,010,836 B2 | 3/2006 | Acton et al. |
| D519,406 S | 4/2006 | Merrill et al. |
| 7,025,297 B2 | 4/2006 | Bell et al. |
| 7,029,067 B2 | 4/2006 | Vits et al. |
| 7,040,696 B2 | 5/2006 | Vits et al. |
| 7,073,866 B1 | 7/2006 | Berdahl |
| 7,077,475 B2 | 7/2006 | Boyle |
| 7,080,856 B2 | 7/2006 | Desmarais et al. |
| 7,100,991 B2 | 9/2006 | Schroth |
| 7,108,114 B2 | 9/2006 | Mori et al. |
| 7,118,133 B2 | 10/2006 | Bell et al. |
| 7,131,667 B2 | 11/2006 | Bell et al. |
| 7,137,648 B2 | 11/2006 | Schulz et al. |
| 7,137,650 B2 | 11/2006 | Bell et al. |
| 7,140,571 B2 | 11/2006 | Hishon et al. |
| 7,144,085 B2 | 12/2006 | Vits et al. |
| 7,147,251 B2 | 12/2006 | Bell et al. |
| D535,214 S | 1/2007 | Kolasa |
| 7,159,285 B2 | 1/2007 | Karlsson |
| 7,180,258 B2 | 2/2007 | Specht et al. |
| 7,182,370 B2 | 2/2007 | Arnold |
| 7,210,707 B2 | 5/2007 | Schroth |
| 7,216,827 B2 | 5/2007 | Tanaka et al. |
| 7,219,929 B2 | 5/2007 | Bell et al. |
| 7,232,154 B2 | 6/2007 | Desmarais et al. |
| 7,237,741 B2 | 7/2007 | Specht |
| 7,240,405 B2 | 7/2007 | Webber et al. |
| 7,240,924 B2 | 7/2007 | Kohlndorfer et al. |
| 7,246,854 B2 | 7/2007 | Dingman et al. |
| 7,263,750 B2 | 9/2007 | Keene et al. |
| 7,278,684 B2 | 10/2007 | Boyle |
| D555,358 S | 11/2007 | King |
| 7,300,013 B2 | 11/2007 | Morgan et al. |
| 7,341,216 B2 | 3/2008 | Heckmayr |
| 7,360,287 B2 * | 4/2008 | Cerruti et al. ................... 24/633 |
| 7,367,590 B2 | 5/2008 | Koning et al. |
| 7,377,464 B2 | 5/2008 | Morgan |
| 7,384,014 B2 | 6/2008 | Ver Hoven et al. |
| 7,395,585 B2 | 7/2008 | Longley et al. |
| 7,404,239 B1 | 7/2008 | Walton et al. |
| 7,407,193 B2 | 8/2008 | Yamaguchi et al. |
| D578,931 S | 10/2008 | Toltzman et al. |
| 7,452,003 B2 | 11/2008 | Bell |
| 7,455,256 B2 | 11/2008 | Morgan |
| 7,461,866 B2 | 12/2008 | Desmarais et al. |
| 7,475,840 B2 | 1/2009 | Heckmayr |
| 7,477,139 B1 | 1/2009 | Cuevas |
| 7,481,399 B2 | 1/2009 | Nohren et al. |
| 7,506,413 B2 | 3/2009 | Dingman et al. |
| 7,516,808 B2 | 4/2009 | Tanaka |
| 7,520,036 B1 | 4/2009 | Baldwin et al. |
| D592,543 S | 5/2009 | Kolasa |
| 7,533,902 B2 | 5/2009 | Arnold et al. |
| 7,547,043 B2 | 6/2009 | Kokeguchi et al. |
| 7,614,124 B2 | 11/2009 | Keene et al. |
| 7,631,830 B2 | 12/2009 | Boelstler et al. |
| 7,669,794 B2 | 3/2010 | Boelstler et al. |
| 7,673,945 B1 | 3/2010 | Riffel et al. |
| 7,698,791 B2 | 4/2010 | Pezza |
| 7,722,081 B2 | 5/2010 | Van Druff et al. |
| 7,739,019 B2 | 6/2010 | Robert et al. |
| 7,753,410 B2 | 7/2010 | Coultrup |
| 7,775,557 B2 | 8/2010 | Bostrom et al. |
| RE41,790 E | 10/2010 | Stanley |
| 7,861,341 B2 | 1/2011 | Ayette et al. |
| 7,862,124 B2 | 1/2011 | Dingman |
| D632,611 S | 2/2011 | Buscart |
| D637,518 S | 5/2011 | Chen |
| 7,934,775 B2 | 5/2011 | Walker et al. |
| 7,945,975 B2 | 5/2011 | Thomas et al. |
| 8,011,730 B2 | 9/2011 | Greenwood |
| 8,037,581 B2 * | 10/2011 | Gray et al. ....................... 24/633 |
| 8,096,027 B2 | 1/2012 | Jung et al. |
| 8,240,012 B2 | 8/2012 | Walega et al. |
| 8,240,767 B2 | 8/2012 | Greenwood |
| 8,387,216 B1 * | 3/2013 | Martinson ................... 24/30.5 T |
| 2002/0089163 A1 | 7/2002 | Bedewi et al. |
| 2002/0135175 A1 | 9/2002 | Schroth |
| 2002/0145279 A1 | 10/2002 | Murray |
| 2003/0015863 A1 | 1/2003 | Brown et al. |
| 2003/0027917 A1 | 2/2003 | Namiki et al. |
| 2003/0085608 A1 | 5/2003 | Girardin |
| 2004/0084953 A1 | 5/2004 | Hansen |

(56) References Cited

U.S. PATENT DOCUMENTS

| | | |
|---|---|---|
| 2004/0169411 A1 | 9/2004 | Murray |
| 2004/0174063 A1 | 9/2004 | Kocher |
| 2004/0217583 A1 | 11/2004 | Wang |
| 2004/0227390 A1 | 11/2004 | Schroth |
| 2004/0251367 A1 | 12/2004 | Suzuki et al. |
| 2005/0017567 A1 | 1/2005 | Sachs et al. |
| 2005/0073187 A1 | 4/2005 | Frank et al. |
| 2005/0107932 A1 | 5/2005 | Bolz et al. |
| 2005/0127660 A1 | 6/2005 | Liu |
| 2005/0179244 A1 | 8/2005 | Schroth |
| 2005/0206151 A1 | 9/2005 | Ashline |
| 2005/0284977 A1 | 12/2005 | Specht et al. |
| 2006/0071535 A1 | 4/2006 | Kim et al. |
| 2006/0075609 A1 | 4/2006 | Dingman et al. |
| 2006/0097095 A1 | 5/2006 | Boast |
| 2006/0237573 A1 | 10/2006 | Boelstler et al. |
| 2006/0243070 A1 | 11/2006 | Van Druff et al. |
| 2006/0267394 A1 | 11/2006 | David et al. |
| 2006/0277727 A1 | 12/2006 | Keene et al. |
| 2007/0080528 A1 | 4/2007 | Itoga et al. |
| 2007/0241549 A1 | 10/2007 | Boelstler et al. |
| 2007/0257480 A1 | 11/2007 | Van Druff et al. |
| 2008/0018156 A1 | 1/2008 | Hammarskjold et al. |
| 2008/0054615 A1 | 3/2008 | Coultrup |
| 2008/0093833 A1 | 4/2008 | Odate |
| 2008/0100051 A1 | 5/2008 | Bell et al. |
| 2008/0100122 A1 | 5/2008 | Bell et al. |
| 2008/0136246 A1 | 6/2008 | Salter |
| 2008/0172847 A1 | 7/2008 | Keene et al. |
| 2008/0224460 A1 | 9/2008 | Erez |
| 2009/0014991 A1 | 1/2009 | Smyth et al. |
| 2009/0069983 A1 | 3/2009 | Humbert et al. |
| 2009/0179412 A1* | 7/2009 | Gray et al. .................. 280/801.1 |
| 2009/0183348 A1 | 7/2009 | Walton et al. |
| 2009/0212549 A1 | 8/2009 | Jones |
| 2009/0241305 A1 | 10/2009 | Buckingham |
| 2010/0115737 A1 | 5/2010 | Foubert |
| 2010/0125983 A1 | 5/2010 | Keene et al. |
| 2010/0146749 A1 | 6/2010 | Jung |
| 2010/0213753 A1 | 8/2010 | Humbert |
| 2010/0219667 A1 | 9/2010 | Merrill et al. |
| 2011/0010901 A1 | 1/2011 | Holler |
| 2011/0057500 A1 | 3/2011 | Walker et al. |
| 2012/0242134 A1 | 9/2012 | Siegel |
| 2012/0292893 A1 | 11/2012 | Baca et al. |
| 2013/0127229 A1 | 5/2013 | Humbert |

FOREIGN PATENT DOCUMENTS

| | | |
|---|---|---|
| CA | 2112960 | 7/1994 |
| CA | 2450744 | 2/2003 |
| DE | 4019402 | 12/1991 |
| DE | 4421688 | 12/1995 |
| DE | 69019765 | 2/1996 |
| EP | 26564 | 4/1981 |
| EP | 0363062 | 4/1990 |
| EP | 0380442 | 8/1990 |
| EP | 0401455 | 12/1990 |
| EP | 0404730 | 12/1990 |
| EP | 0449772 | 10/1991 |
| EP | 0519296 | 12/1992 |
| EP | 0561274 | 9/1993 |
| EP | 0608564 | 8/1994 |
| EP | 1153789 | 11/2001 |
| EP | 1447021 | 8/2004 |
| FR | 1298012 | 7/1962 |
| GB | 888436 | 1/1962 |
| GB | 1047761 | 11/1966 |
| GB | 1582973 | 1/1981 |
| GB | 2055952 | 3/1981 |
| GB | 2356890 | 6/2001 |
| JP | 52055120 | 5/1977 |
| JP | 63141852 | 9/1988 |
| JP | 63247150 | 10/1988 |
| JP | 10119611 | 5/1998 |
| JP | 2001138858 | 5/2001 |
| WO | WO-8603386 | 6/1986 |
| WO | WO-03009717 | 2/2003 |
| WO | WO-2004004507 | 1/2004 |
| WO | WO-2006041859 | 4/2006 |
| WO | WO-2010/027853 | 3/2010 |

OTHER PUBLICATIONS

European Search Report & Written Opinion; European Patent Application No. EP 06772609.1; Applicant: AmSafe, Inc.; Date of Mailing: Apr. 21, 2011, 7 pages.

European Search Report & Written Opinion; European Patent Application No. EP 09704423; Applicant: AmSafe Commercial Products, Inc.; Date of Mailing: Mar. 22, 2011, 6 pages.

Final Office Action; U.S. Appl. No. 12/051,768, Mailing Date Nov. 12, 2010, 14 pages.

Final Office Action; U.S. Appl. No. 12/563,294, Mailing Date Sep. 30, 2011, 8 pages.

Final Office Action; U.S. Appl. No. 12/027,985, dated Jan. 27, 2012, 14 pgs.

Global Seating Systems LLC, "CCOPS," Cobra: Soldier Survival System, 1 page, undated.

Holmbergs, "Art.No. 63-4959-XX and 63-4958-XX GR.1 Buckle, 3/5 point." Accessed Sep. 15, 2010. www.holmbergs.se. (2 pages).

Holmbergs, "Gr. 0+ 3-point buckle with plastic chassi and tongues." Accessed Sep. 15, 2010. www.holmbergs.se. (1 page).

Holmbergs, "Gr. 1 Buckle, Viking." Accessed Sep. 15, 2010. www.holmbergs.se. (1 page).

Holmbergs, "Group 1 Systems." Accessed Sep. 15, 2010. www.holmbergs.se. (1 page).

Holmbergs, "Infant buckle with steel tongues." Accessed Sep. 15, 2010. www.holmbergs.se. (1 page).

Holmbergs, "Infant buckle. 5-point with plastic chassi and plastic tongues." Accessed Sep. 15, 2010. www.holmbergs.se. (1 page).

Novarace, "DL: Group 1 Buckle." Accessed Sep. 15, 2010. www.novarace.com. (1 page).

Novarace, "GT 3: Group 0 Buckle." Accessed Sep. 15, 2010. www.novarace.com (1 page).

Novarace, "GT 5: Group 0 Buckle." Accessed Sep. 15, 2010. www.novarace.com (1 page).

Novarace, "GT: Group 1 Buckle." Accessed Oct. 8, 2010. www.novarace.com. (1 page).

Novarace, "KMA 1: Group 1 Buckle." Accessed Sep. 15, 2010. www.novarace.com. (1 page).

Sabelt Catalog, "SAB104: Standard tongue hole to facilitate webbing insert," p. 23 (1 page).

Sabelt, "Daphne 0: Fiberglass-plastic buckle with metal pin latch." Accessed Sep. 15, 2010. www.sabelt.com (1 page).

Sabelt, "RO1000: Fiberglass-plastic buckle with metal pin latch." Accessed Sep. 15, 2010. www.sabelt.com (1 page).

Sabelt, "SAB004: Fiberglass-plastic buckle with metal pin latch." Accessed Sep. 15, 2010. www. sabelt.com. (1 page).

Sabelt, "SABUSA004: Fiberglass-plastic buckle with metal pin latch." Accessed Sep. 15, 2010. www.sabelt.com. (1 page).

Schroth Safety Products, Installation Instructions, HMMWV Gunner restraint, Single Lower with Swivel—M1151, Revision: A, Jul. 28, 2006, pp. 1-10.

Toltzman, Randall and Shaul, Rich; "Buckle Assembly"; U.S. Appl. No. 29/297,210, filed Nov. 6, 2007.

Non-Final Office Action, Dated Jun. 20, 2013, U.S. Appl. No. 13/187,265, 17 pages.

"ExxonMObil Santoprene 221-55 Thermoplastic Elastomer" materials sheet. Retrieved from http://www.matweb.com/search/datasheet.aspx?matguid=67de0de851854bb085afcfac35e294f5&ckck=1 on Jul. 8, 2013.

ASTM D395-03 (Reapproved 2008) "Standard Test Methods for Rubber Property—Compression Set", Retrieved from http://enterprise2.astm.org/DOWNLOAD/D395.1656713-1.pdf on Jul. 9, 2013.

* cited by examiner

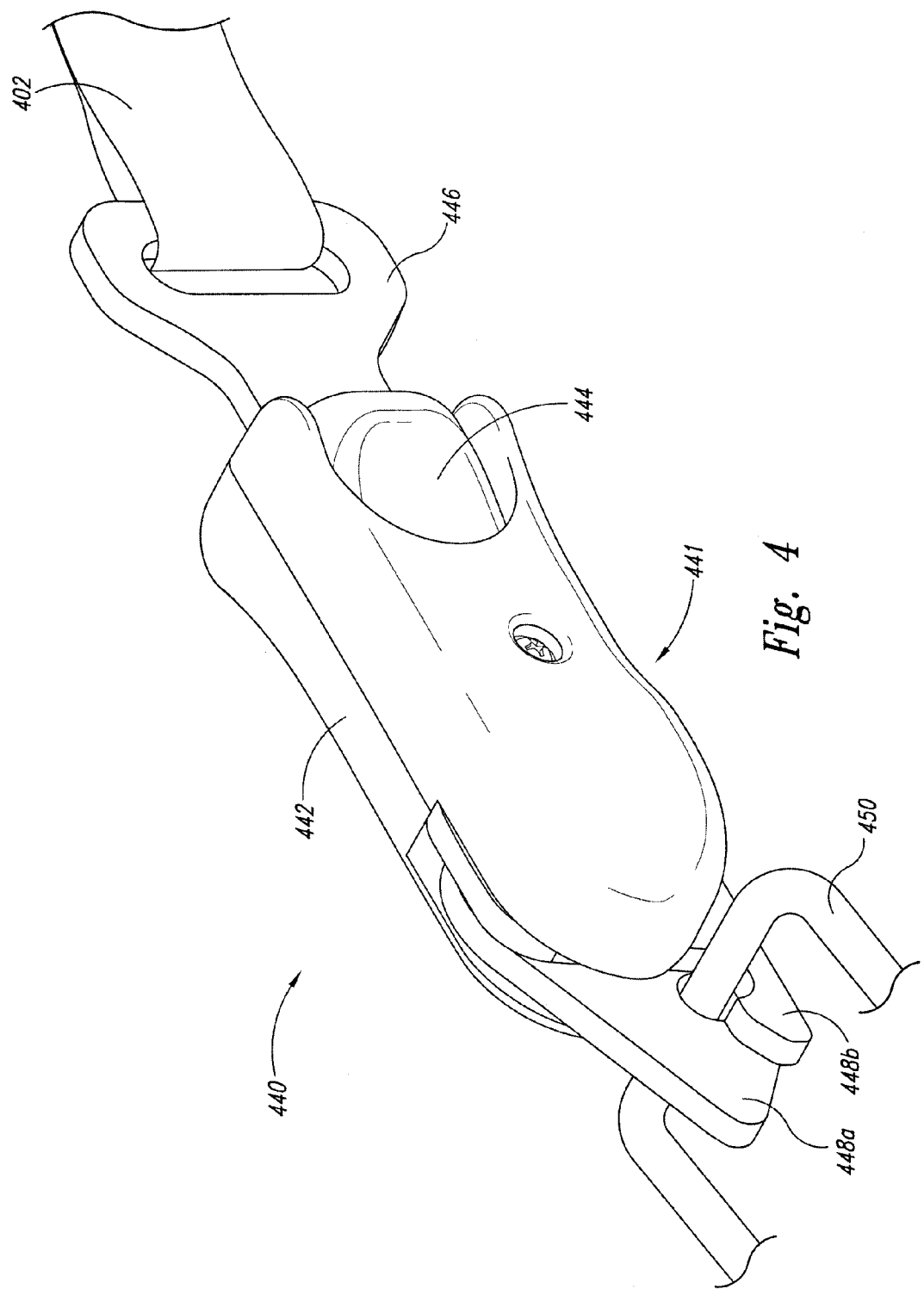

RESTRAINT SYSTEM BUCKLE COMPONENTS HAVING TACTILE SURFACES, AND ASSOCIATED METHODS OF USE AND MANUFACTURE

CROSS-REFERENCE TO RELATED APPLICATION

The present application claims priority under 35 USC §119(e) to U.S. Provisional Application No. 61/258,110, filed Nov. 4, 2009, the disclosure of which is incorporated herein by reference in its entirety.

TECHNICAL FIELD

The following disclosure relates generally to personal restraint systems for use in vehicles and, more particularly, to buckle assemblies and associated components having tactile surfaces for use with child seats and other restraint systems.

BACKGROUND

There are many types of personal restraint systems for use in automobiles, aircraft, all-terrain-vehicles, and other vehicles. Such systems include, for example, seat belts for use by adults and children of sufficient size, and child seats with associated restraints for use by toddlers and small children.

One method of securing the seat belts or webs around an occupant includes releasably attaching an end portion of each of the webs to a buckle assembly. The buckle assembly retains the webs around the occupant during use, and also enables the occupant to release or separate the webs after use. Conventional buckle assemblies can be positioned to the side of an occupant or in front of an occupant. For example, a "three point" harness system, as typically found in conventional automobiles, can include a shoulder web and a lap web that are releasably secured to a buckle assembly positioned proximate to the occupant's hip. A "five point" harness system can include a crotch web, first and second shoulder webs, and first and second lap webs that are releasably secured to a buckle assembly positioned proximate to the occupant's mid-section.

BRIEF DESCRIPTION OF THE DRAWINGS

FIGS. 3 and 4 isometric views of assemblies configured in accordance with other embodiments of the disclosure.

DETAILED DESCRIPTION

The following disclosure describes surface finishes for buckle assemblies and associated components for use with child seats and other personal restraint systems in vehicles. As described in greater detail below, a surface finish for a component of a buckle assembly configured in accordance with one aspect of the disclosure can include a tactile or soft texture. Certain details are set forth in the following description and in FIGS. 1-4 to provide a thorough understanding of various embodiments of the disclosure. However, other details describing well-known structures and systems often associated with buckle assemblies, web connectors, and/or other aspects of personal restraint systems are not set forth below to avoid unnecessarily obscuring the description of various embodiments of the disclosure.

Many of the details, dimensions, angles, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

Figure 1:
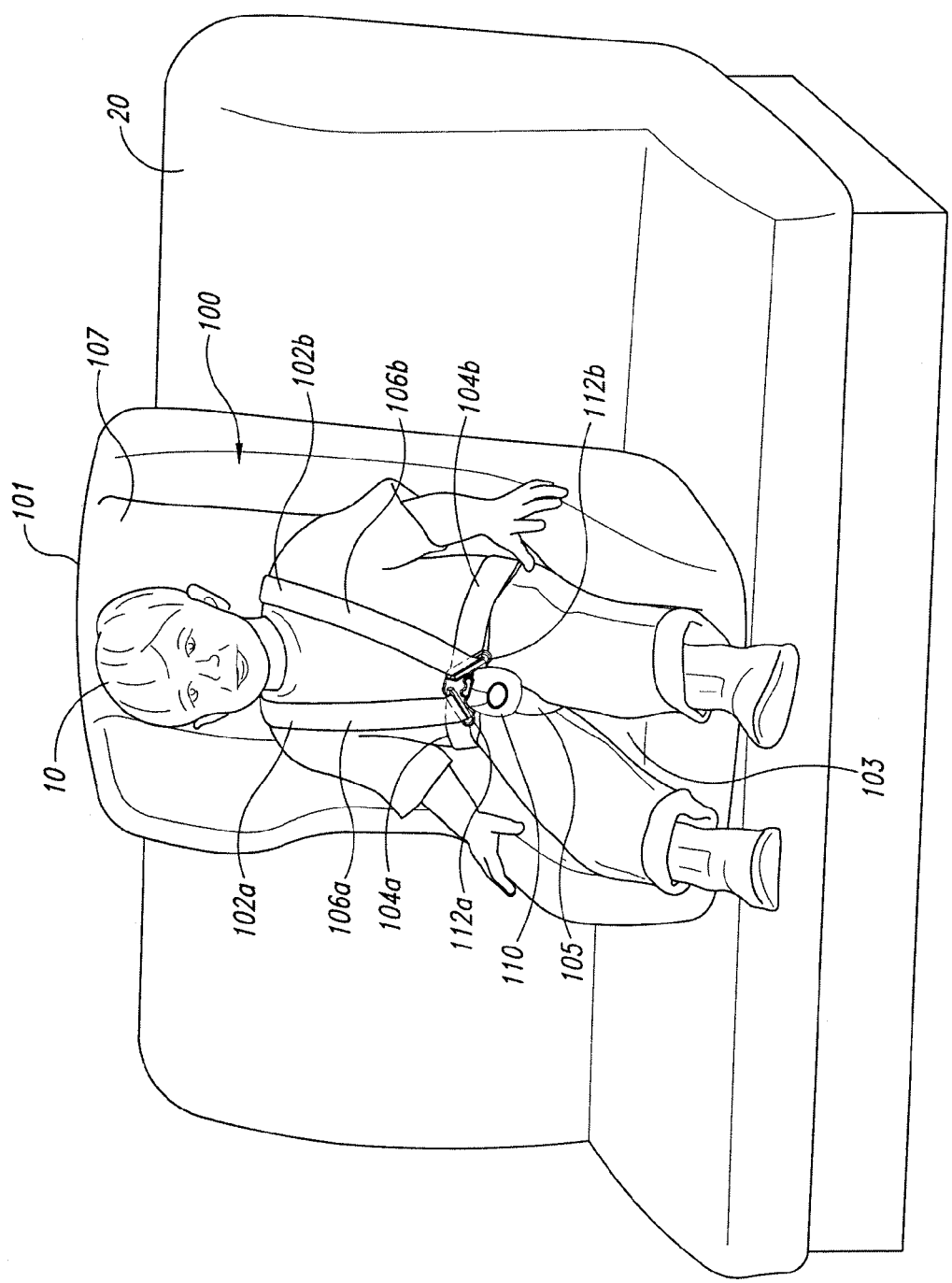
FIG. 1 is an isometric view of a child secured in a child seat with a restraint system having a buckle assembly configured in accordance with an embodiment of the disclosure.

FIG. 1 is an isometric view illustrating a restraint system 100 having buckle assembly components with compliant, tactile surfaces in accordance with an embodiment of the disclosure. In the illustrated embodiment, the restraint system 100 holds a vehicle occupant 10 (e.g., a child) in a child seat 101. In other embodiments, however, the restraint system 100 and associated buckle assembly 110 can restrain any type of occupant in a vehicle without a child seat 101. In the illustrated embodiment, the child seat 101 includes a base portion 103 and a back portion 107. The child seat 101 can be secured to a vehicle seat 20 using various systems known in the art. Such systems can include, for example, belts or webs (not shown) having proximal ends attached to the child seat 101 and distal ends attached to anchors (also not shown) in the bight of the vehicle seat 20 with suitable couplings. In other embodiments, the child seat 101 can be secured to the vehicle seat 20, and/or other vehicle structures, using other suitable methods known in the art. Moreover, in further embodiments the child seat 101 or variations thereof can be reversed so that the child seat 101 is facing rearward toward the vehicle seat 20. Accordingly, as the foregoing illustrates, embodiments of the present disclosure and applications of the buckle assemblies and web connectors disclosed herein are not limited to the particular child seat configuration illustrated in FIG. 1.

In the illustrated embodiment, the restraint system 100 includes a first shoulder web 102a and a second shoulder web 102b extending from the back portion 107 of the child seat 101. The shoulder webs 102 can include various types of woven fabric materials and/or other suitable belt or strap materials known in the art that provide sufficient strength, flexibility, durability and/or other characteristics. In this embodiment, each of the shoulder webs 102 slidably passes through an aperture in a corresponding web connector 112 (identified individually as a first web connector 112a and a second web connector 112b). Passing the shoulder webs 102 through the web connectors 112 divides each of the shoulder webs 102 into a corresponding shoulder web portion 106 (identified individually as a first shoulder web portion 106a and a second shoulder web portion 106b), and a corresponding lap web portion 104 (identified individually as a first lap web portion 104a and a second lap web portion 104b). The lap web portions 104 extend away from each other toward opposite sides of the child seat 101. The end portions of the shoulder webs 102 can be secured or otherwise affixed to the child seat 101 and/or other adjacent structures using various methods known in the art.

As described in greater detail below, at least a portion of the web connectors 112 and/or at least a portion of the buckle assembly 110 have a soft, tactile surface finish or texture. In the illustrated embodiment, the buckle assembly 110 is attached to a distal end of a crotch web 105 that extends from the base portion 103 of the child seat 101. The proximal end of the crotch web 105 can be secured to the child seat 101 and/or other adjacent structures using various methods known in the art. Although FIG. 1 illustrates one possible use of the buckle assembly 110 (e.g., use with a "five point" harness), those of ordinary skill in the art will appreciate that the buckle assembly 110 and the other components of the restraint system 100 can be used in a number of other restraint system applications without departing from the spirit or scope of the present disclosure.

Figure 2A:
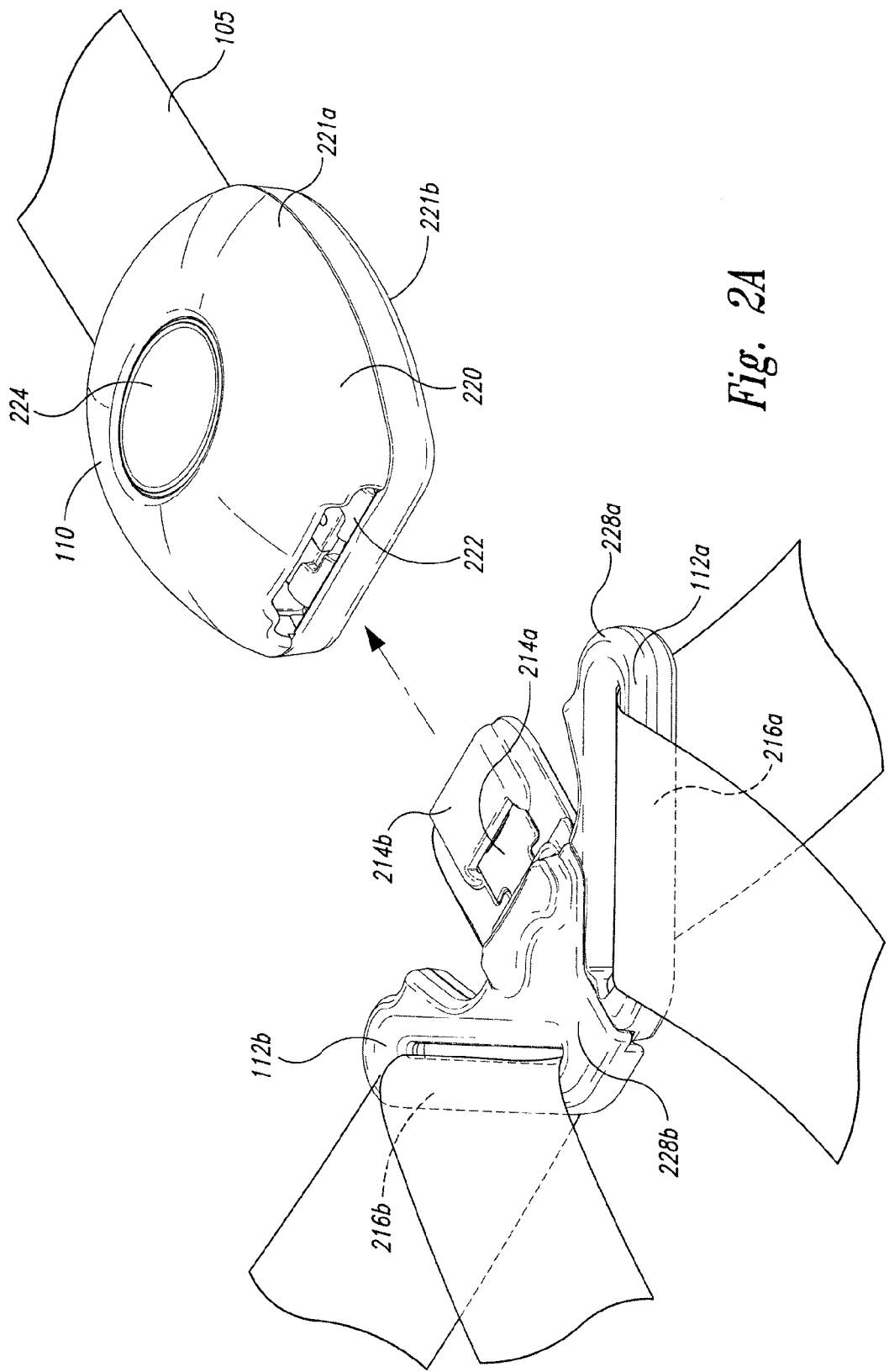
FIGS. 2A and 2B are enlarged isometric views the buckle assembly and web connectors of FIG. 1.
Figure 2B:
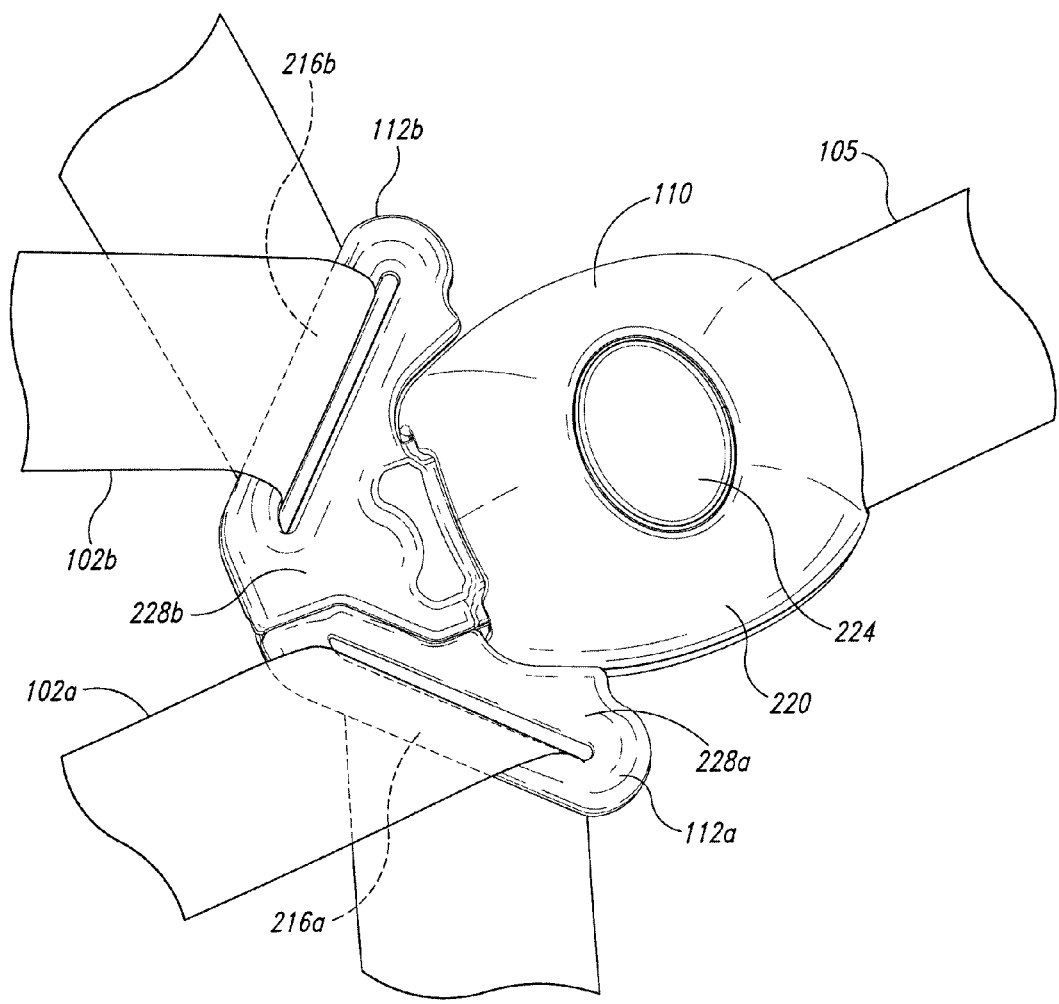

FIGS. 2A and 2B are enlarged isometric views the buckle assembly 110 of FIG. 1. Referring first to FIG. 2A, each of the web connectors 112 includes a tongue 214 (identified individually as a first tongue 214a and a second tongue 214b) and a web receiving portion 216 (identified individually as a first web receiving portion 216a and a second web receiving portion 216b). The tongues 214 include engagement features that are configured to releasably engage corresponding locking features in the buckle assembly 110. In the illustrated embodiment, the web connectors 112 are configured to be mated or interlocked with one another so that the tongues 214 can be simultaneously inserted into the buckle assembly 110. In other embodiments, however, the web connectors 112 can be configured to be inserted separately into the housing 220.

According to an aspect of the illustrated embodiment, the buckle assembly 110 includes a housing 220 comprising a first or top cover 221a opposite a second or bottom cover 221b. The housing 220 also has a tongue opening 222 to receive the tongues 214 when a user inserts the tongues 214 into the buckle assembly 110. The buckle assembly 110 also includes a release actuator or button 224. The button 224 is configured to release or disengage the tongues 214 from locking features of the buckle assembly 110 when a user actuates the button 224.

FIG. 2B illustrates the web connectors 112 fully inserted into the housing 220 and releasably secured to the buckle assembly 110. Referring to FIGS. 2A and 2B together, in another aspect of the illustrated embodiment, at least a portion of each of the web connectors 112, the housing 220, and the button 224 includes a durable surface finish having a soft feel that facilitates grasping and/or manipulation of these components. Each of the web connectors 112 includes a cover 228 (identified individually as a first connector cover 228a and a second connector cover 228b) that fits over the respective web receiving portion 216. As noted above, the housing 220 includes the top cover 221a and the bottom cover 221b. Each of the covers 221, 228, as well as the button 224, can be formed from plastic (e.g., injection molded plastic) and/or other suitable materials known in the art that are bonded, press fit, and/or otherwise attached to the respective parts. In other embodiments, these covers can be made from other suitable materials, such as cast metal, etc.

In the certain embodiments, the web connector covers 228, the housing covers 221, and the button 224 can have a surface finish formed from a two component urethane paint (e.g., resin and thinner) and a hardener. One example of such a surface finish is Alsa Soft Feel® Paint available from the Also Corporation, 2640 E. 37th Street, Vernon, Calif. 90058, U.S.A. In other embodiments, these surface finishes can be formed from other paints or coverings that provide suitable soft or tactile textures. In the illustrated embodiment, the covers or surface finishes can be applied by painting the corresponding components (e.g., spray painting or brushing), by immersing the corresponding components in the paint or other type of coating, or by other suitable techniques. The surface finishes can be applied after forming these components using suitable manufacturing techniques known in the art (e.g., cold forming or stamping metallic components, molding plastic components, etc.). In yet other embodiments, these surface finishes can be incorporated into the connector covers 228, the housing covers 221, and/or the button 224 when these components are formed.

In one embodiment, the coatings or surface finishes on the covers 221, 228, and/or the button 224 can have a durometer hardness equal to or less than approximately Shore A 70. In other embodiments, these coatings or surface finishes can have a durometer hardness in the range of approximately Shore A 20-60. In still further embodiments, these coatings or surface finishes can have a durometer hardness in the range of approximately Shore A 30-50, or approximately Shore A 40. Moreover, in certain embodiments these coatings or surface finishes can have a first thickness (e.g., about 1-3 mils or more) that can be elastically compressed or otherwise deformed to a second thickness that is approximately 85-95% of the first thickness. In other embodiments, the second thickness can be approximately 90% of the first thickness.

These surface finishes are configured to facilitate grasping and/or manipulation of their corresponding components. For example, these surface finishes can be formed to have a smooth, rough, tactile, compliant, and/or generally soft feel. These surface finishes can also improve a user's comfort. For example, the surface finishes can be configured to have specific textures, such as textures generally similar to suede, soft leather, velvet, silk, rubber, etc. that are comfortable against a user's skin. These surface finishes can also improve the aesthetic appeal of the buckle assembly 110. For example, these surface finishes can be applied in various colors or finishes (e.g., matte, shiny, etc.). Moreover, these surface finishes provide durable protection to the buckle assembly.

In certain embodiments, the surface finish of each of the web connector covers 228, the housing covers 221, and the button 224 can each have the same texture or feel. In other embodiments, however, these surface finishes can have different textures or hardness. For example, the button 224 can have a softer texture or hardness than the housing covers 221, and vice versa. Moreover, in certain embodiments, a surface finish can include different regions or portions having different textures.

Although these surface finishes have been described above with reference to FIGS. 1-2B, in other embodiments these surface finishes can be applied to other buckle or latch assemblies and associated components for use with personal restraint systems, including, for example, the buckle assemblies described in U.S. patent application Ser. No. 12/357,356, entitled "BUCKLE ASSEMBLIES AND ASSOCIATED CONNECTORS FOR USE WITH CHILD SEATS AND OTHER RESTRAINT SYSTEMS," filed Jan. 21, 2009, which is incorporated herein by reference in its entirety.

Figure 3:
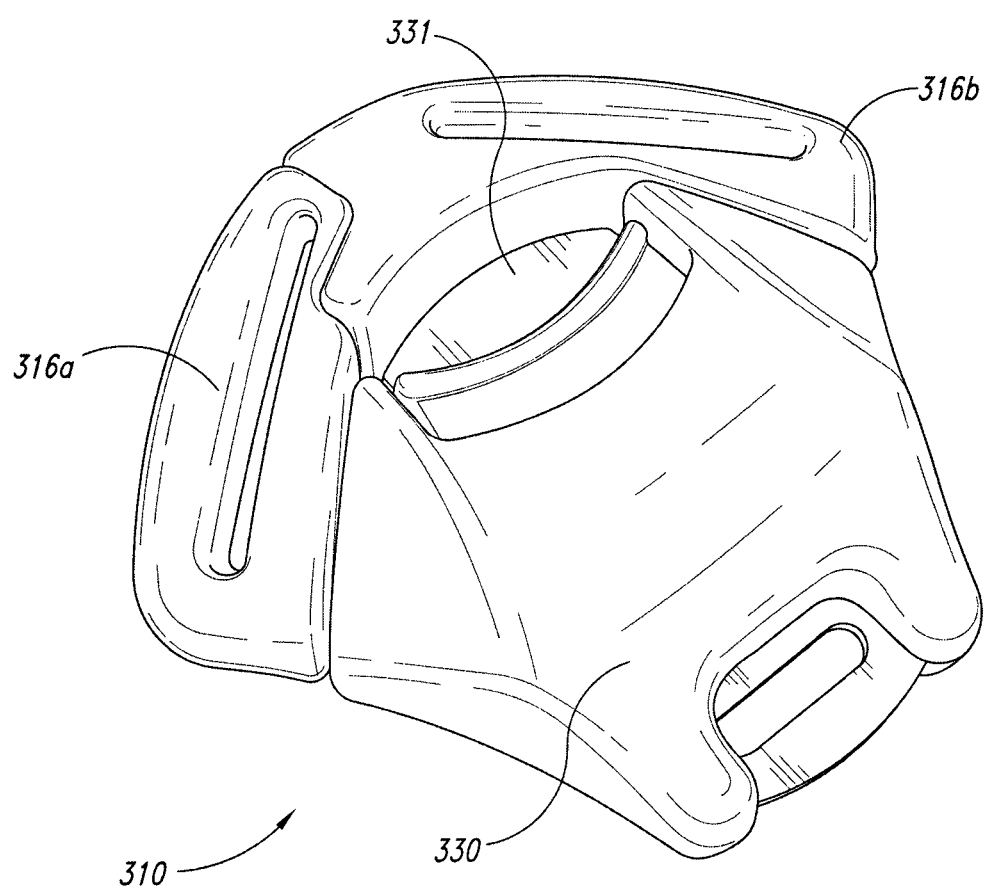

FIGS. 3 and 4 isometric views of assemblies configured in accordance with other embodiments of the disclosure. Referring first to FIG. 3, FIG. 3 illustrates a buckle assembly 310 including several components with a soft or tactile surface finish as generally described above. For example, the buckle assembly 310 includes web connector covers 316 (identified individually as a first connector cover 316a and a second connector cover 316b), a housing cover 330, and a button 331 having compliant or soft surface finishes. These surface finishes can have the same features and properties as the surface finishes described above with reference to FIGS. 2A-2B.

FIG. 4 is an isometric view of a latch assembly 440 that is configured to couple a child car seat to an anchor 450 in a vehicle (not shown). More specifically, the latch assembly 440 includes a latch 441 that is configured to couple a web 402 to the anchor 450. The anchor 102 can be a metal bar or loop mounted in the bight of a seat or positioned at other locations in a vehicle. In the illustrated embodiment, the latch 441 includes an actuator 444 movably coupled to a frame 446. The frame 446 is coupled to the web 402. The latch 441 also includes jaws 448 (identified individually as a first jaw 448a and a second jaw 448b) pivotally coupled to a frame 446 that are movable in response to manipulation of the actuator. The latch assembly 440 also includes a housing 442 that at least partially covers the actuator 444, the frame 446, and the jaws 448.

In the illustrated embodiment, at least one of the housing 442 and the actuator 444 has a tactile or soft surface finish. These surface finishes can have the same features and properties as the surface finishes described above with reference to FIGS. 2A-3.

The embodiments of the buckle assemblies and surface finishes described above provide several advantages over conventional buckle assemblies. One advantage, for example, is that the surface finishes provide a pleasant texture while manipulating or otherwise handling the corresponding buckle assemblies. These surface finishes also provide a relatively inexpensive covering that protects the buckle assembly for wear or damage.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

I claim:

1. A restraint assembly for releasably restraining an occupant in a vehicle, the restraint assembly comprising:
   a web connector including
      a tongue having an engagement feature;
      a web receiving portion configured to receive a web; and
      a tongue cover at least partially covering the web receiving portion;
   a housing assembly configured to releasably engage the web connector tongue,
      the housing assembly including
         a housing cover, wherein the housing cover at least partially defines an opening that receives the tongue; and
         one or more locking features configured to releasably engage the engagement feature; and
      an actuator movable relative to the housing assembly, wherein movement of the actuator from a first position toward a second position releases the one or more locking features from the engagement feature;
   wherein the housing cover has a first surface finish with a first durometer hardness equal to or less than approximately Shore A 70, and the actuator has a second surface finish with a second durometer hardness equal to or less than approximately Shore A 70, and wherein the second durometer hardness is different from the first durometer hardness.

2. The restraint assembly of claim 1 wherein at least one of the first and second surface finishes is elastically compressible.

3. A restraint assembly for releasably restraining an occupant in a vehicle, the restraint assembly comprising:
   a web connector including
      a tongue having an engagement feature;
      a web receiving portion configured to receive a web; and
      a tongue cover at least partially covering the web receiving portion;
   a housing assembly configured to releasably engage the web connector tongue,
      the housing assembly including
         a housing cover, wherein the housing cover at least partially defines an opening that receives the tongue; and
         one or more locking features configured to releasably engage the engagement feature; and
      an actuator movable relative to the housing assembly, wherein movement of the actuator from a first position toward a second position releases the one or more locking features from the engagement feature;
   wherein at least one of the tongue cover, the housing cover, or the actuator includes a surface finish having a durometer hardness equal to or less than approximately Shore A 70, and wherein the surface finish has a texture of soft leather.

4. The restraint assembly of claim 3 wherein the surface finish comprises a paint.

5. The restraint assembly of claim 4 wherein the paint comprises a urethane paint.

6. A restraint assembly for releasably restraining an occupant in a vehicle, the restraint assembly comprising:
   a first web connector including
      a first tongue having a first engagement feature;
      a first web receiving portion configured to receive a first web; and
      a first tongue cover at least partially covering the first web receiving portion;
   a second web connector including
      a second tongue having a second engagement feature;
      a second web receiving portion configured to receive a second web; and
      a second tongue cover at least partially covering the second web receiving portion;
   a housing assembly configured to releasably engage the first and second tongues, the housing assembly including
      a housing cover, wherein the housing cover at least partially defines an opening that receives at least the first tongue; and
      one or more locking features configured to releasably engage at least the first engagement feature; and
   an actuator movable relative to the housing assembly, wherein movement of the actuator from a first position toward a second position releases the one or more locking features from the first engagement feature;
   wherein each of the first tongue cover and the second tongue cover includes a surface finish having a durometer hardness equal to or less than approximately Shore A 70.

7. The restraint assembly of claim 6 wherein the surface finish comprises a paint.

8. The restraint assembly of claim 7 wherein the paint comprises a urethane paint.

9. A web connector assembly comprising:
   a web connector configured to be coupled to a web;
   a housing assembly configured to receive at least a portion of the web connector;
   a first coating disposed over at least a portion of the housing assembly, wherein the first coating has a first thickness and is elastically compressible to a second thickness that is approximately 90% of the first thickness;
   an actuator movable relative to the housing assembly, wherein movement of the actuator releases the web connector from the housing assembly; and a second coating disposed over at least a portion of the actuator; and a third coating disposed over at least a portion of the web connector, wherein each of the second and third coatings has the first thickness and is elastically compressible to the second thickness.

10. A web connector assembly comprising:

a web connector configured to be coupled to a web;

a housing assembly configured to receive at least a portion of the web connector;

a first coating disposed over at least a portion of the housing assembly, wherein the first coating has a first thickness and is elastically compressible to a second thickness that is approximately 90% of the first thickness; and a second coating disposed over at least a portion of the web connector, wherein the second coating is softer than the first coating.

11. The web connector assembly of claim 10 wherein the first coating has a durometer hardness that is equal to or less than approximately Shore A 70.

12. A web connector assembly comprising:

a web connector configured to be coupled to a web;

a housing assembly configured to receive at least a portion of the web connector; and a coating disposed over at least a portion of the housing assembly, wherein the coating has a first thickness and is elastically compressible to a second thickness that is approximately 90% of the first thickness, wherein the coating comprises a urethane paint, and wherein the urethane paint comprises a resin, a thinner, and a hardener.

13. A method of manufacturing a personal restraint assembly, the method comprising:

forming a web connector having a tongue portion and a web receiving portion;

covering at least a portion of the web receiving portion with a first coating having a durometer hardness equal to or less than approximately Shore A 70;

forming a housing assembly having a housing cover at least partially defining an opening that receives the tongue portion; and covering at least a portion of the housing cover with a second coating, wherein the first coating is softer than the second coating.

14. The method of claim 13 wherein covering at least a portion of the web receiving portion comprises painting at least a portion of the web receiving portion with the first coating.

15. The method of claim 14 wherein painting at least a portion of the web receiving portion comprises brushing the first coating on at least a portion of the web receiving portion.

16. The method of claim 14 wherein painting at least a portion of the web receiving portion comprises spraying the first coating on at least a portion of the web receiving portion.

17. The method of claim 13 wherein covering at least a portion of the housing cover comprises at least partially immersing the housing cover in the second coating when the second coating is in a liquid form.

18. The method of claim 13 wherein forming the web connector comprises at least partially cold forming the tongue portion and the web receiving portion.

19. The method of claim 13 wherein forming the housing comprises injection molding the housing cover.

\* \* \* \* \*